United States Patent [19]
Coates

[11] 4,156,177
[45] May 22, 1979

[54] APPARATUS AND METHOD FOR DETERMINATION OF FREE FLUID IN SUBSURFACE FORMATIONS

[75] Inventor: George R. Coates, Houston, Tex.

[73] Assignee: Schlumberger Technology Corporation, New York, N.Y.

[21] Appl. No.: 788,393

[22] Filed: Apr. 18, 1977

[51] Int. Cl.² .......................... G01V 3/12; G01V 3/18
[52] U.S. Cl. ........................................................ 324/6
[58] Field of Search ............................................ 324/6

[56] References Cited

U.S. PATENT DOCUMENTS 3,944,910  3/1976  Rau ........................................ 324/6

Primary Examiner—Gerard R. Strecker
Attorney, Agent, or Firm—Martin M. Novack; Kenneth Olsen; Bruce N. Carpenter

[57] ABSTRACT

The disclosure is directed to an apparatus and method for determining the bound-water-filled porosity of formations surrounding a borehole. Bound-water-filled porosity is the fraction of the formation unit volume (matrix plus fluid) which is occupied by bound water, bound water being the portion of the total water which is adsorbed or bound to, or impermeably held by, the matrix. In one embodiment, means are provided for deriving a first quantity which is a measure of the attenuation of microwave electromagnetic energy passed through the formations of interest. This first quantity may be, for example, the attenuation constant determined for the microwave electromagnetic energy passing through the formations. Means are provided for generating a second quantity which is substantially proportional to the square of the first quantity. The second quantity is indicative of the bound-water-filled porosity of the formations. In another embodiment of the invention, means are provided for deriving a third quantity which is representative of the total porosity of the formations. In this embodiment, a further means is provided for generating a fourth quantity as a function of the difference between the third quantity and the second quantity, the fourth quantity being indicative of the free fluid index of the formations.

16 Claims, 4 Drawing Figures

APPARATUS AND METHOD FOR DETERMINATION OF FREE FLUID IN SUBSURFACE FORMATIONS

BACKGROUND OF THE INVENTION

This invention relates to the investigation of earth formations and, more particularly, to an apparatus and method for determining the bound-water-filled porosity of formations surrounding a borehole.

Modern well logging technology has advanced to a point where a number of subsurface parameters, for example porosity and lithology, can often be determined with reasonable accuracy. However, a reliable technique for determining the permeability of formations (i.e., a measure of the ease with which fluid can flow through a pore system), has not been forthcoming. Resistivity gradients have been used to estimate the order of magnitude of formation permeability, but this technique is found useful only in certain types of formations. It has been suggested that a measurement of the amount of "free fluid" in shaly formations would be a good permeability indicator. A known technique for measuring "free fluid" is the nuclear magnetic resonance tool, but attainable signal-to-noise ratios tend to be a limiting factor of performance for this tool.

In the copending U.S. patent application Ser. No. 674,791, now U.S. Pat. No. 4,063,151, of R. Rau and J. Suau, assigned to the same assignee as the present application, there is disclosed a technique for determining the amount of bound water in formations surrounding a borehole by measuring the dielectric constant of the formations at two different microwave frequencies. The difference between the measurements taken at the two frequencies is utilized to determine the amount of bound water in the formations. In another copending U.S. patent application Ser. No. 674,792, now U.S. Pat. No. 4,077,003, of R. Rau, also assigned to the present assignee, determinations of dielectric loss factors are taken at two different frequencies and are utilized to obtain information about the amount of bound water in the formations.

It is one object of the present invention to determine, without the need for dual frequency measurements, the bound-water-filled porosity of formations surrounding a borehole.

SUMMARY OF THE INVENTION

Applicant has discovered that the bound-water-filled porosity of formations surrounding a borehole can be determined from a measure of the attenuation of microwave electromagnetic energy, at a frequency within a predetermined range, passed through the formations of interest. In particular, over a range of frequencies from about 0.9 GHz to about 1.3 GHz, and preferably at about 1.1 GHz, the bound-water-filled porosity is substantially proportional to the square of the measured attenuation constant for the microwave electromagnetic energy passed through the formations of interest. The stated relationship is found to substantially apply even in the presence of a significant volume of unbound ("free") water, typically mud filtrate (preferably of relatively fresh mud) which has replaced movable fluids flushed from the invaded zone of the formations.

The present invention is directed to an apparatus and method for determining the bound-water-filled porosity of formations surrounding a borehole. As used herein, bound-water-filled porosity is intended to mean the fraction of the formation unit volume (matrix plus fluid) which is occupied by bound water, bound water being that portion of the total water which is adsorbed or bound to, or impermeably held by, the matrix. Shales generally contain bound water and terms such as "shale water" are also sometimes utilized to designate bound water. In accordance with an embodiment of the invention, means are provided for deriving a first quantity which is a measure of the attenuation of microwave electromagnetic energy passed through the formations of interest. This first quantity may be, for example, the attenuation constant determined for the microwave electromagnetic energy passing through the formations. Means are provided for generating a second quantity which is substantially proportional to the square of the first quantity. The second quantity is indicative of the bound-water-filled porosity of the formations.

In another embodiment of the invention, means are provided for deriving a third quantity which is representative of the total porosity of the formations. The third quantity may be derived, for example, from other logging information. In this embodiment, a further means is provided for generating a fourth quantity as a function of the difference between the third quantity and the second quantity, the fourth quantity being indicative of the free fluid index of the formations.

Further features and advantages of the invention will become more readily apparent from the following detailed description when taken in conjunction with the accompanying drawings.

DESCRIPTION OF THE PREFERRED EMBODIMENT

Figure 1:
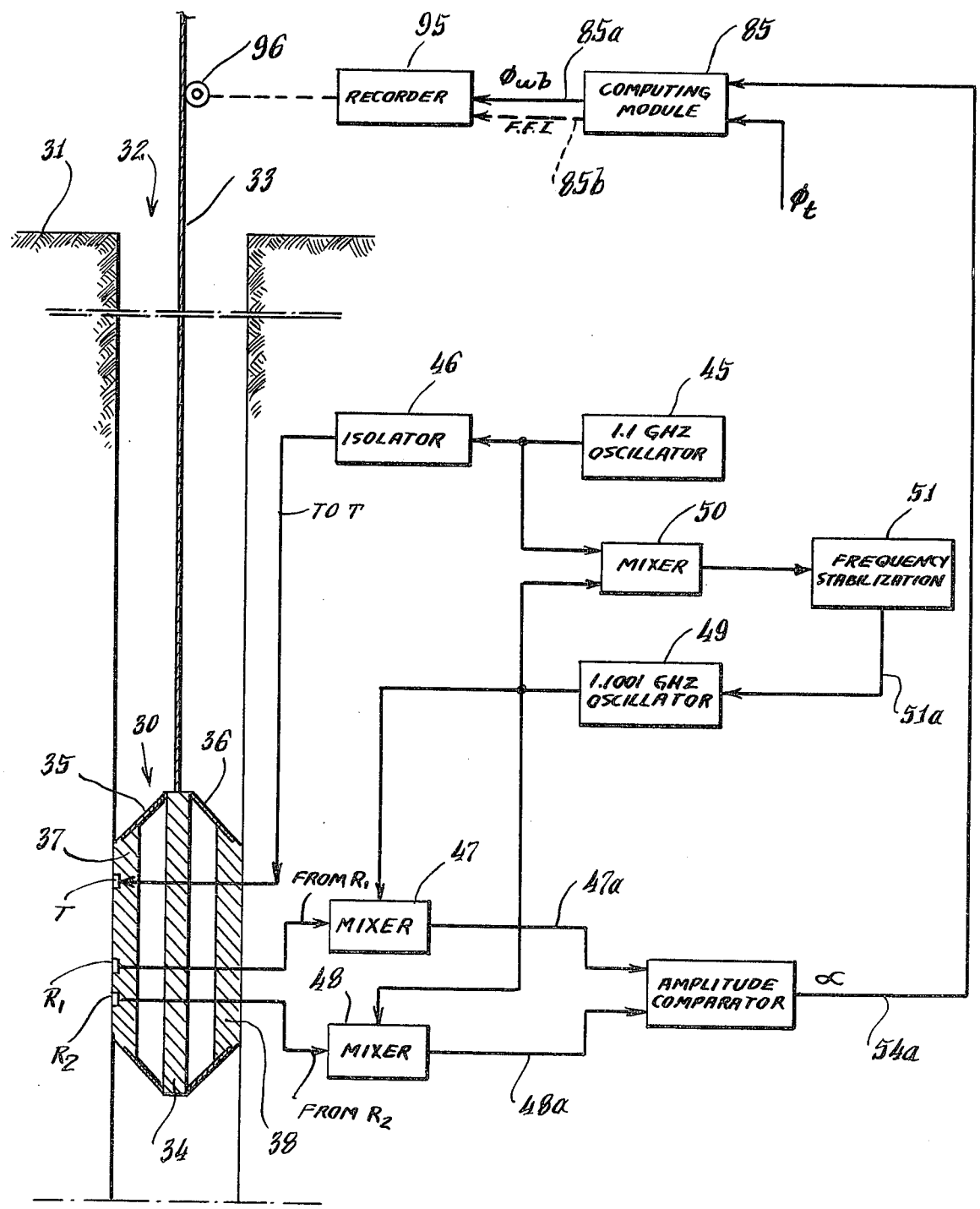
FIG. 1 is a schematic representation, partially in block form, of an apparatus incorporating an embodiment of the invention.

Consider a plane electromagnetic wave propagating in a lossy medium. The propagation constant, $\gamma$, of the wave is generally represented as $$\gamma = \omega\sqrt{\mu\epsilon}\sqrt{1+j(\sigma/\mu\epsilon)} \tag{1}$$

where $\omega$ is the angular frequency of the wave, $\mu$ is the magnetic permeability of the medium, $\epsilon$ is the dielectric constant of the medium, and $\sigma$ is the conductivity of the medium. It is conventional to express the real and imaginary parts of the propagation constant as $\beta$ and $\alpha$, respectively, so that $$\gamma = \beta + j\alpha \tag{2}$$

where $\beta$ is a phase constant and $\alpha$ is the attenuation constant of the wave. (Note that the propagation constant is used in the well known wave equation in the form $e^{j\gamma}$, so the real part of the propagation constant becomes the imaginary part of the exponent, and vice versa. This accounts for the imaginary part of the propagation constant being associated with loss.) Squaring equations (1) and (2) and equating the real and imaginary parts gives $$\beta^2 - \alpha^2 = \mu\epsilon\omega^2 \qquad (3)$$

and $$2\alpha\beta = \mu\sigma\omega \qquad (4)$$

In the above referenced copending applications and in the U.S. Pat. No. 3,944,910 there are disclosed techniques for determining the phase and attenuation constants associated with microwave electromagnetic energy traversing subsurface formations. The determined phase and/or attenuation information is then utilized, for example employing the relationships (3) and (4), to determine properties of the formations, such as its dielectric constant or its porosity. As noted in the background hereof, measurements taken at two different frequencies can also be utilized to determine the amount of bound water in the formations. In the present invention the bound-water-filled porosity of formations, designated $\phi_{wb}$, is determined as being substantially proportional to the square of the measured attenuation constant for the microwave electromagnetic energy passed through the formations. In equation form, this is expressed by $$\phi_{wb} = K\alpha^2 \qquad (5)$$

The free fluid index ("FFI") is the fraction of the formation unit volume occupied by "free" (unbound) fluid, that is $$FFI = \phi_t - \phi_{wb} \qquad (6)$$

where $\phi_t$ is total porosity of the formation.

Referring to FIG. 1, there is shown a representative embodiment of an apparatus in accordance with the present invention for investigating subsurface formations 31 traversed by a borehole 32. The borehole 32 is typically filled with a drilling fluid or mud which contains finely divided solids in suspension. The investigating apparatus or logging device 30 is suspended in the borehole 32 on an armored cable 33, the length of which substantially determines the relative depth of the device 30. The cable length is controlled by suitable means at the surface such as a drum and winch mechanism (not shown).

The logging device 30 includes an elongated cylindrical support member 34, the interior portion of which has a fluid-tight housing containing the bulk of the downhole electronics. Mounted on support member 34 are a pair of bowed springs 35 and 36. The spring 35 has mounted thereon a pad member 37 which contains, inter alia, a transmitting antenna T and vertically spaced receiving antennas $R_1$ and $R_2$. Mounted on the spring 36 is a secondary pad member 38 which may be an inactive pad that facilitates smooth vertical movement of the device 30 through the borehole. If desired, however, the pad 38 may contain electrodes or like additional means for investigating the surrounding formations. Electronic signals indicative of the in formation obtained by the logging device are transmitted through the cable 32 to a computing module 85 and recorder 95 located at the surface of the earth. The particular means shown in FIG. 1 for maintaining the antennas in engagement with the borehole wall is illustrative, and it will be appreciated that other suitable means for accomplishing this objective, such as hydraulic means, can be utilized.

Figure 2:
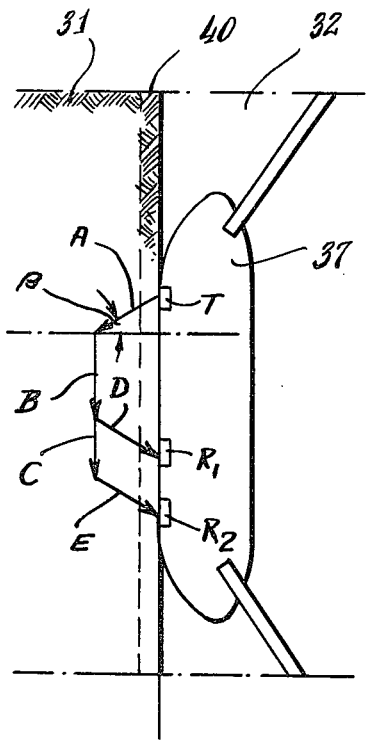
FIG. 2 illustrates, in simplified form, the nature of propagation of a microwave electromagnetic lateral wave in the formations.

FIG. 2 illustrates, in simplified form, the nature of propagation of the electromagnetic wave to be measured with the apparatus of FIG. 1. (For a more detailed description of the wave propagation path, as well as further description of the type of logging device employed herein and known as an electromagnetic propagation tool or "EPT," reference can be made to the U.S. Pat. No. 3,944,910 of R, Rau.) In FIG. 2 the pad 37 is shown positioned against the side of the borehole 32 which, as above-stated, is filled with a drilling mud. Generally, the fluid pressure in the formations traversed by a borehole is less than the hydrostatic pressure of the column of mud in the borehole, so that the mud and mud filtrate flows somewhat into the formations. The formations tend to screen the small particles suspended in the mud so that a mudcake is formed on the walls of the borehole. The thickness of the mudcake varies with formation parameters such as permeability, but at least a very thin mudcake is usually present on the borehole wall. In FIG. 2, the pad 37 contacts a mudcake 40 which is shown as being of exaggerated scole thickness for illustrative clarity.

The transmitting antenna T emits microwave electromagnetic energy into the formation as represented by the arrow A. A resultant surface wave propagating in the formation is represented by the arrow B and its extension, arrow C. The surface wave continuously sheds energy back into the more lossy media (the mudcake), and the portions of energy which are shed at the approximate locations of the receivers $R_1$ and $R_2$ are represented by the arrows D and E, respectively. If the pathlengths represented by arrows D and E are assumed to be substantially equal, it is seen that the difference in pathlength between the energy received at $R_1$ (via path A-B-D) and the energy received at $R_2$ (via path A-B-C-E) is the distance represented by arrow C; i.e., the distance between the receivers. Accordingly, a differential receiver arrangement allows investigation of the portion of the formation lying approximately opposite the separation between $R_1$ and $R_2$. Typically, but not necessarily, the investigated formation will be the "flushed" or "invaded" zone which surrounds the mudcake in the borehole and contains fluids from the mud which filter through the mudcake. The EPT type of device employed herein is particularly effective for investigating the invaded zone in a borehole drilled with relatively fresh water-based mud.

Referring again to FIG. 1, the downhole electronics contained within the member 34 are shown, for convenience of illustration, at the side of the borehole. A solid state oscillator 45 provides output energy in the microwave region of the spectrum. The microwave region is defined herein as including the range of frequencies between about 300 MHz and 300 GHz. The oscillator 45 may operate at the suitable frequency of 1.1 GHz; i.e. $1.1 \times 10^9$ cycles per second. The output of oscillator 45 is coupled through an isolator 46 to the transmitting antenna T. Microwave energy is transmitted into the surrounding formations and propagates through the formations in the manner previously described. The energy which arrives at the receiving antennas $R_1$ and $R_2$ is respectively coupled to input terminals of the mixers 47 and 48. The signals which arrive from $R_1$ and $R_2$ are out of phase with each other by an amount which depends on the phase constant $\beta$ and have an amplitude ratio which depends upon the attenuation constant $\alpha$.

Secondary input terminals of the mixers are supplied with microwave energy at a frequency that is separated from the transmitter frequency by some relatively low frequency which is typically in the radio frequency range. In the embodiment shown, a solid state oscillator 49 supplies microwave energy to mixers 47 and 48 at a frequency of 1.1001 GHz, or 100 KHz above the transmitter frequency. The output signals 47A and 48A of the mixers 47 and 48 therefore contain the difference frequency of 100 KC. In accordance with well known principles, the signals 47A and 48A maintain the phase and amplitude relationships of the signals from $R_1$ and $R_2$, but the task of phase detection (performed generally in this type of logging device, but not necessary for the present invention) is greatly facilitated at the lower frequency of the mixed signals. To insure that the difference frequency between the outputs of the oscillators 45 and 49 remains at 100 KHz, the oscillator outputs are sampled and fed to a mixer 50. The output of the mixer is received by a frequency stabilization circuit 51 which detects drifts from the 100 KHz standard and generates a correction signal 51A which controls oscillator 49 in the manner of a conventional "phase-locked loop."

Figure 3:
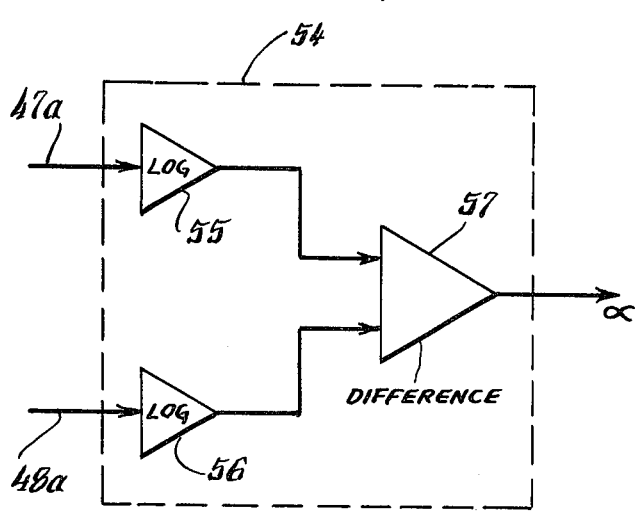
FIG. 3 is a block diagram of the amplitude comparator of FIG. 1.

The signals 47A and 48A are typically applied to a phase detector circuit (not required herein, and not shown) and to an amplitude comparator 54. The output of amplitude comparator 54 is a signal level which is proportional to the attenuation constant $\alpha$. A convenient circuit 54 for obtaining an output signal proportional to $\alpha$ is shown in FIG. 3. The signals 47A and 48A are respectively applied to the logarithmic amplifiers 55 and 56 whose outputs are fed to the difference amplifier 57. The output of the difference amplifier 57 is a signal level proportional to $\alpha$. This can be visualized by representing the amplitude of the wave energy received at $R_1$ as $Ae^{-\alpha z}$, where A is an amplitude constant and z is the distance separating T and $R_1$. It follows that the amplitude of the wave energy received at $R_2$ is $Ae^{-\alpha(z+L)}$, where L is the distance separating the receivers $R_1$ and $R_2$. The ratio of the wave amplitudes at the two receivers is therefore $$Ae^{-\alpha(z+L)}/Ae^{-\alpha z} = e^{-\alpha L}.$$

The log of the ratio of the wave amplitudes is therefore proportional to $\alpha$. It will be appreciated that the circuit 54 of FIG. 3 accomplishes the same mathematical result by taking the difference of the logs of the wave amplitudes.

The output representative of $\alpha$ is transmitted to the surface over a conductor 54a which in actuality passes through the armored cable 33. Typically, the signal may be a DC level which is stepped up by amplification before transmission to the surface. At the surface of the earth the signal on line 54a is applied to a computing module 85 which computes the bound-water-filled porosity, $\phi_{wb}$, of the formations in accordance with the relationship (5). A signal representative of the total porosity, $\phi_t$, may also be input to the computing module 85 which can then determine the free fluid index (FFI) of the formations in accordance with the relationship (6). The computed quantities are recorded by a recorder 95 that is conventionally driven as a function of borehole depth by mechanical coupling to a rotating wheel 96. The wheel 96 is coupled to the cable 33 and rotates in synchronism therewith so as to move as a function of borehole depth. Thus, the bound-water-filled porosity and/or the free fluid index of the formations are recorded as a function of borehole depth by the recorder 95.

Figure 4:
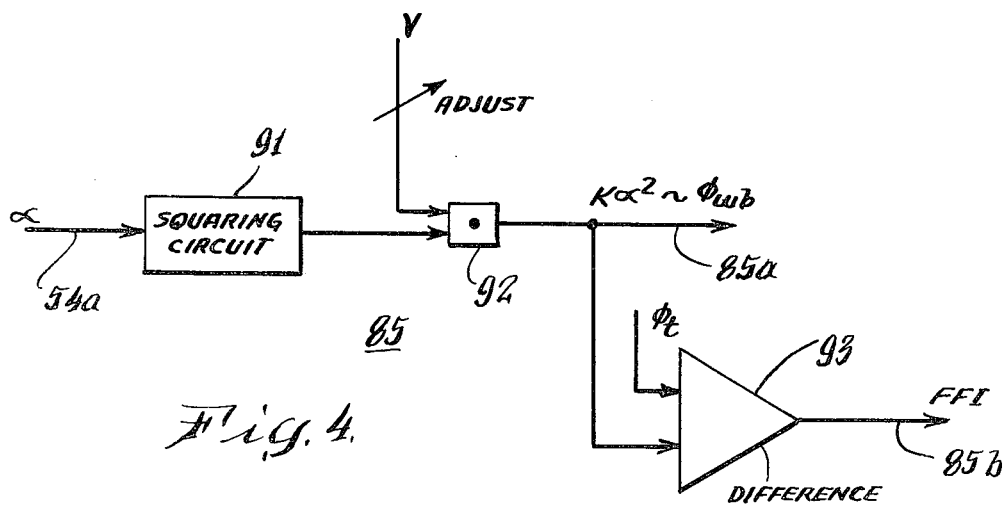
FIG. 4 is a block diagram of the computing module of FIG. 1.

FIG. 4 is a block diagram of the computing module 85 which receives the signal on line 54a that is indicative of the measured value of $\alpha$. The signal representative of $\alpha$ is coupled to a squaring circuit 91, the output of which is representative of $\alpha^2$. This signal is, in turn, applied to one input of a multiplier 92, the other input of which receives an adjustable input having a value designated K. Accordingly, the output of the multiplier 92 is a signal having a value $K\alpha^2$ and which is representative of the bound-water-filled porosity, $\phi_{wb}$, of the formations, in accordance with the relationship (5). The output of multiplier 92 (line 85A) is coupled to the recorder 95 and also to the negative input terminal of a difference amplifier 93. The positive input terminal of the difference amplifier 93 receives a signal representative of the total porosity of the formations of interest, $\phi_t$. This latter signal may be determined, for example, from other logging information, such as from neutron/density logging information. The output of difference amplifier 93 (line 85B), also coupled to recorder 95, is representative of the free fluid index of the formations, in accordance with the relationship (6). As used herein, the bound-water-filled porosity and free fluid index are defined in terms of fractions of the formation total or bulk unit volume. In this sense, these terms are interchangeable with similar terms expressing the amount, volume, or fraction of bound or free fluid in the formations.

The invention has been described with reference to a particular embodiment, but variations within the spirit and scope of the invention will occur to those skilled in the art. For example, while circuitry has been described for generating analog signals representative of the desired quantities, it will be understood that a general purpose digital computer could readily be programmed to implement the techniques as set forth herein. Also, it should be noted that the advantageous principles of known borehole compensation techniques and/or of redundant processing channels, such as are disclosed in U.S. Pat. No. 3,849,721, can be utilized, if desired, in conjunction with the present invention. Further, it will be understood that the measured values can, if desired, be corrected for mudcake effect, spreading, or temperature variations, as is known in the art. Finally, although the illustrative embodiment shows various quantities as being derived directly from a logging device, these quantities may alternatively be derived from storage media or communicated from a logging location.

I claim:

1. Apparatus for determining the free fluid index of formations surrounding a borehole, comprising:

means for deriving a first quantity which is a measure of the attenuation of microwave electromagnetic energy passed through said formations;

means for generating a second quantity which is substantially proportional to the square of said first quantity;

means for deriving a third quantity which is a representative of the total porosity of the formations; and means for generating a fourth quantity as a function of the difference between said third quantity and said second quantity;

said fourth quantity being indicative of the free fluid index of said formations.

2. Apparatus as defined by claim 1 wherein said first quantity is the attenuation constant of microwave electromagnetic energy passed through the formations.

3. Apparatus as defined by claim 1 wherein said microwave electromagnetic energy has a frequency of about 1.1 GHz.

4. Apparatus as defined by claim 1 wherein said microwave electromagnetic energy has a frequency of about 1.1 GHz.

5. Apparatus for determining the free fluid index of formations surrounding a borehole, comprising:
   means for injecting microwave electromagnetic energy into the formations;
   means for measuring the attenuation of the microwave electromagnetic energy passing through the formations;
   means responsive to the measured attenuation for generating a signal which is substantially proportional to the square of the measured attenuation;
   means for deriving another signal which is representative of the total porosity of the formations; and
   means for generating a further signal as a function of the difference between said another signal and said signal;
   said further signal being indicative of the free fluid index of said formations.

6. Apparatus as defined by claim 5 wherein said means for measuring attenuation includes means for obtaining the attenuation constant of said formations.

7. Apparatus as defined by claim 5 wherein said microwave electromagnetic energy has a frequency of about 1.1 GHz.

8. Apparatus as defined by claim 6 wherein said microwave electromagnetic energy has a frequency of about 1.1 GHz.

9. A method for determining the free fluid index of formations surrounding a borehole, comprising the steps of:
   deriving a first quantity which is a measure of the attenuation of microwave electromagnetic energy passed through said formations;
   generating a second quantity which is substantially proportional to the square of said first quantity;
   deriving a third quantity which is a measure of the total porosity of the formations; and
   generating a fourth quantity as a function of the difference between said third quantity and said second quantity;
   said fourth quantity being indicative of the free fluid index of said formations.

10. The method as defined by claim 9 wherein said first quantity is the attenuation constant of microwave electromagnetic energy passed through the formations.

11. The method as defined by claim 9 wherein said microwave electromagnetic energy has a frequency of about 1.1 GHz.

12. The method as defined by claim 10 wherein said microwave electromagnetic energy has a frequency of about 1.1 GHz.

13. A method for determining the bound-water-filled porosity of formations surrounding a borehole, comprising the steps of:
    injecting microwave electromagnetic energy into the formations;
    measuring the attenuation of the microwave electromagnetic energy passing through the formations;
    generating a signal which is substantially proportional to the square of the measured attenuation;
    deriving another signal which is representative of the total porosity of the formations; and
    generating a further signal as a function of the difference between said another signal and said signal;
    said further signal being indicative of the free fluid index of said formations.

14. The method as defined by claim 13 wherein the step of measuring attenuation includes determining the attenuation constant of said formations.

15. The method as defined by claim 13 wherein said microwave electromagnetic energy has a frequency of about 1.1 GHz.

16. The method as defined by claim 14 wherein said microwave electromagnetic energy has a frequency of about 1.1 GHz.

* * * * *

UNITED STATES PATENT AND TRADEMARK OFFICE
CERTIFICATE OF CORRECTION

PATENT NO. : 4,156,177
DATED : May 22, 1979
INVENTOR(S) : George R. Coates

It is certified that error appears in the above—identified patent and that said Letters Patent are hereby corrected as shown below:

Col. 2, line 51, equation (1) should be $$--\gamma = \omega\sqrt{\mu\varepsilon}\ \sqrt{1 + j\frac{\sigma}{\mu\varepsilon}}--$$

col. 3, line 63 change "in formation" to --information--

Signed and Sealed this

Thirteenth Day of November 1979

[SEAL]

Attest:

RUTH C. MASON
*Attesting Officer*

LUTRELLE F. PARKER
*Acting Commissioner of Patents and Trademarks*